April 8, 1952     J. FAURE-HERMAN     2,591,798
ELECTRIC TACHOMETER
Filed Jan. 11, 1949                           2 SHEETS—SHEET 1
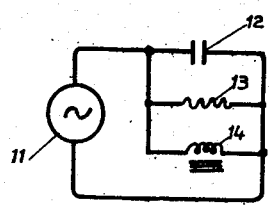
Fig. 1
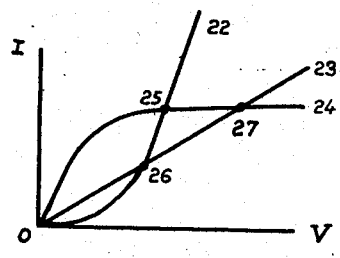
Fig. 2
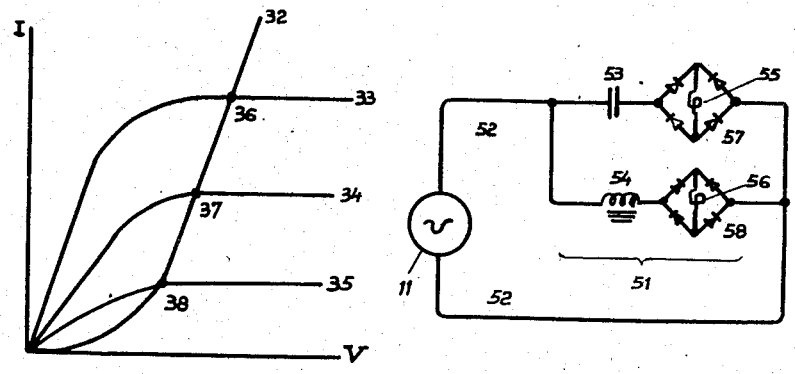
Fig. 3          Fig. 5
Fig. 4
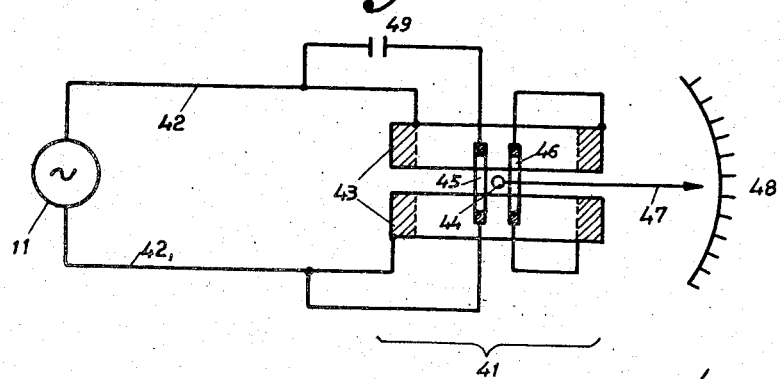
INVENTOR
JEAN FAURE-HERMAN
By Young, Emery & Thompson
Attys.

Patented Apr. 8, 1952

2,591,798

UNITED STATES PATENT OFFICE 2,591,798

ELECTRIC TACHOMETER

Jean Faure-Herman, Boulogne-sur-Seine, France

Application January 11, 1949, Serial No. 70,187
In France January 16, 1948

6 Claims. (Cl. 175—183)

Tachometers are already known which are formed of an electric generator supplying a potential difference which is proportional to the speed and of a receiver which is directly graduated in speed. Some operate with direct current and others with alternating current and the receivers are generally voltmeters which use known measuring elements. Exceptionally, when it is intended to survey one speed zone of a small magnitude the voltmeter is substituted by a frequency meter. However, such tachometers which use frequency meters are not currently used, the frequency meters being devices which are more fragile and more delicate the more reduced their measuring extent is. Moreover, such tachometers are very expensive due to the use of the frequency meter.

The present invention has for its object, more particularly, to remedy these drawbacks.

The invention first relates to an electric speed measuring method in which an alternating electric energy is produced, the voltage and the frequency of which are proportional to the speed to be measured and this electric energy is supplied to two loading circuits in such a manner that the electric currents which flow through said circuits vary according to the different laws proportionally to the speed and both so produced currents are then compared in order to deduce therefrom the speed variation about a considered value, this method making it possible to measure the speed divergences from a mean value with a high precision without it being necessary to use a frequency meter.

According to one form of the present invention the current generator, the voltage and the frequency of which are proportional to the speed is caused to feed into loading circuits established in such a manner that the law for the variation of the currents which flow through the same is approximately a square law, a lineary law or a law which is independent of the speed, and in this case the loading circuits may be a condenser, a resistor or a self-inductor respectively.

The invention covers these methods in a general manner irrespectively of the apparatus used for carrying out the same.

However, the invention also relates to a tachometer which makes it possible to carry out the preceding methods or similar methods in a particularly advantageous and efficacious manner.

The methods and apparatus which make it possible to carry out the preceding methods show the characteristic features which will appear from the following description and more particularly from the appended claims.

The methods and tachometers in accordance with the invention are shown by way of example in the appended drawings in which:

Figure 1 shows the general principle of the method which comprises an alternating current generator supplying current in parallel to a condenser, a resistor and an inductance.

Figure 2 shows a diagram of the current in the condenser, the resistor and the inductance of the device of Figure 1 proportional to the speed of the alternator.

Figure 3 shows a diagram of the current in the condenser and of the currents in inductors of various values proportional to the speed of the alternator.

Figure 4 is a diagrammatic view showing one form of tachometer.

Figures 5 and 6 are diagrammatic views showing other forms of tachometers.

Figure 6:
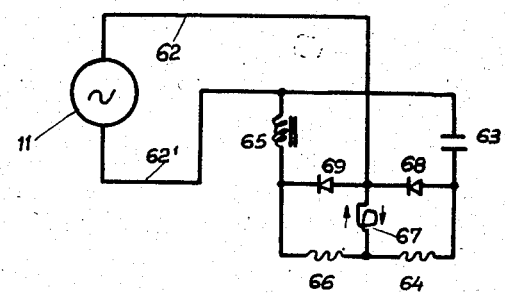

According to the method of the invention a mode of connections is used giving indications which are proportional both to the voltage of the electric current generator and to the frequency of the currents supplied by said generator.

The currents supplied by the alternating current generator 11 (Figure 1) are compared the variations of which follow different laws proportional to the speed according as the current flowing through a condenser, a resistor or a self-inductor or any other electric members is considered. In the diagram of Figure 1 the alternating current generator 11 supplies three circuits in shunt:

The first circuit formed of a condenser 12 having a capacity C,

A second circuit formed of a resistor 13 with a value R, and

A third circuit formed of a self-inductor 14 having the value L.

The voltage U supplied by the generator is proportional to the speed V to be measured but the pulsation frequency $\omega$ is also proportional to the speed so that:

$$U = K_1 V$$

and $$\omega = K_2 V$$

The voltage U being applied to each of the three circuits the current $I_c$ in the condenser has the value:

$$I_c = UC\omega$$

or by substituting U and ω as functions of V:

$$I_c = K_1 K_2 C \cdot V^2$$

Thus the current in the condenser is proportional to the square of the speed.

Under the same conditions the current in the resistance:

$$I_R = \frac{U}{R} = \frac{K_1}{R} \cdot V$$

is proportional to the speed while the current in the self-inductor $$I = \frac{U}{\omega L} = \frac{K_1 V}{K_2 V L} = \frac{K_1}{K_2} \cdot \frac{1}{L}$$

is independent of the speed provided the latter, however, is sufficient in order that the resistance of the self inductor is high with respect that of the resistor.

Figure 2 shows curves of currents proportional to the speed.

The curve 22 of the current in condenser 12 is parabolic ($I_c = K_1 K_2 C \cdot V^2$).

The curve 23 of the current in the resistor 13 is lineary $$\left( I_R = \frac{K_1}{R} \cdot V \right)$$

The curve 24 of the current in the self inductor is as a rule a straight line parallel with the speed axis since the current which flows through this self inductor is independent of the speed of the alternator. However, for small speeds the resistance of the self inductor is preponderant so that the current is first proportional to the speed but for a higher speed the resistance of the self inductor prevails over that of the resistor so that the current tends toward a constant value as previously stated. It results from the forms of said curves that the latter intersect two by two at points 25, 26 and 27. The method according to the invention essentially consists in comparing two of the three currents with each other in a zone near the points of intersection of curves 22, 23 and 24 and, for example, the current in condenser 12 and the current in self inductor 14.

The comparison of said currents at the points of intersection of both curves makes it possible to estimate the speed variation of the alternator in the neighbourhood of the speed corresponding to the points of intersection and, accordingly, to survey a speed zone of a small magnitude with a high precision.

Supposing that the difference of the currents $I_c$ which flows through the condenser and $I_L$ which flows through the self inductor is effected, an examination of the curves of Figure 2 shows that the difference $I = I_c - I_L$ is first negative and that it becomes nil for a speed corresponding to the point of intersection 25 whereafter it becomes positive for higher speeds.

If small speed divergences Δv about point 25 are to be measured it is possible to admit the proportionality between Δv and Δi.

If it is desired to survey two or more speed ranges it is sufficient to choose a plurality of points of intersection as, for example, 36, 37 and 38 as indicated in Figure 3. This latter shows the characteristic curves of the current as a function of the speed when the current in the condenser (curve 32) is compared with the currents in a self inductor with multiple taps (curves 33, 34 and 35). Thus it is sufficient to change the tap of the self inductor in order that the indications of the receiver relate to three different ranges of speed. A similar result would be obtained by using a single self inductor and a plurality of values of capacity for the condenser or by modifying the values of the self inductor and of the condenser simultaneously.

Figure 4 shows a first form of construction of the tachometer for carrying out the above described method in which the comparison of the currents which flow through a condenser and a self inductor is effected by measuring the difference of two electric torques which are proportional to both said currents.

Generator 11 is connected to receiver 41 by means of connections 42 and 42₁. Receiver 41 is formed of an electro-dynamic measuring instrument with or without a magnetic circuit. This electro-magnetic measuring element comprises an inductor winding 43 and a movable element moving around axis 44. The movable element carries both frames 45 and 46 and pointer 47 which moves in front of dial 48.

Frame 46 is series connected to winding 43 which is self inductive while frame 45 is series connected to condenser 49. Owing to this fact the current which flows through frame 46 is a self induction current which follows a law proportional to the speed similar to that of curve 24 of Figure 2 or of curves 33, 34, 35 of Figure 3. The current coming from the alternator and flowing successively in series through condenser 49 and coil 45 is a capacitive current and when it is admitted that the inductance of coil 45 is small with respect to the capacitance of condenser 49, said current follows a law similar to those which are represented by curve 22 of Figure 2 or 32 of Figure 3. The current is supplied to both frames by means of spiral springs not shown in the drawing which define a mechanical antagonistic torque.

The currents in frames 45 and 46 produce fluxes which create two electro-dynamic torques with the flux of inductor coil 43.

When the connections with the frames are made with the convenient polarities the resulting electric torque will be equal to the algebraical difference between both elemental torques, so that dial 48 may be graduated in speed divergences. The equality of the torques takes place for a predetermined speed of the generator; however, for this speed, the movable element occupies the same position of equilibrium as when the generator is at rest. It is possible to do away with the indetermination by abutting the spiral springs so that the mechanical zero lies outside the graduation.

Figure 5 shows another form of construction of the tachometer in which the capacity and self induction currents are rectified before they are compared by means of a magneto-electric differential galvanometer. To this end, the alternating current generator 11 delivers through connections 52 and 52¹ on the one hand into condenser 53 and, on the other hand, into self-inductor 54. Series connected with condenser 53 and self inductor 54 are the Wheatstone bridge connected rectifiers 57 and 58. The middle branch of each Wheatstone bridge rectifier 57 and 58 is connected to frames 55 and 56 respectively of a differential galvanometer.

Figure 6 shows a tachometer in which the difference between the rectified currents coming from the condenser and the self inductor is made electrically before being applied to the measuring element.

In this case generator 11 supplies two shunt circuits through connections 62 and 62¹.

The first circuit comprises condenser 63 and resistor 64 and the second circuit comprises self inductor 65 and resistor 66. The movable frame 67 of a magneto-electric galvanometer is mounted in the known connection. The rectifier derives a half-alternation of the capacity current outside the frame and rectifier 69 derives a half-alternation of the self induction current in a like manner. The direction of the rectifiers is such that both other half-alternations of the currents flow through frame 67 in a reverse direction so that the resulting current has as a mean value the difference between the capacity and self induction currents. It is to be noted that this result is obtained independently of the relative phase between both currents so the connections are still valid when either the condenser or the self inductor is substituted by a resistor according to the invention.

I claim:

1. In an electric tachometer, means for producing an alternating electric current, the voltage and the frequency of which are proportional to the speed to be measured, two different loading circuits connected to the alternating electric current producing means to be energized thereby, said loading circuits being such that the electric currents which flow through the same vary according to different laws as functions of the frequency and the voltage applied across the same, and means for linearly measuring the algebraic difference of the currents which flow through the two loading circuits in order to deduce the speed variation about a considered value for which the algebraic difference is zero.

2. In an electric tachometer, means for producing an alternating electric current, the voltage and frequency of which are proportional to the speed which it is desired to measure, two different loading circuits connected to the electric current producing means to be energized thereby, said loading circuits being such that the electric currents which flow through the same vary, on the one hand according to a square law and, on the other hand, according to a linear law as functions simultaneously of the frequency and of the voltage applied across the same, and means for determining the algebraic difference of the currents which flow through the two loading circuits in order to deduce the speed variation about a considered value for which the algebraic difference is zero.

3. In a tachometer, an electric generator generating an alternating current the voltage and the frequency of which vary proportionally to the speed to be measured, a condenser, a self inductance, means for causing the generator to feed the condenser while supplying a current proportional to the square of the speed of said generator, means for causing the generator to feed the self inductance while supplying in a certain region a current which is independent of the speed, and means for measuring the algebraic difference of the two currents which flow through the condenser and the self inductance.

4. In a tachometer, an electric generator generating an alternating current, the voltage and the frequency of which vary porportionally to the speed to be measured, a condenser and a self-inductance connected in parallel, means for causing the generator to feed the condenser while supplying a current proportional to the square of the speed of the generator and to feed the self inductance while supplying in a certain region a current which is independent of the speed, and means including two rectifiers and a galvanometer with a single frame and with antagonistic mechanical torque producing means for measuring the algebraic difference of the mean values of the two currents which flow through the condenser and the self inductance.

5. In a tachometer, an electric generator generating an alternating current, the voltage and the frequency of which vary proportionally to the speed to be measured, a condenser and a resistance, means for causing the generator to feed to the condenser while supplying a current proportional to the square of the speed of the generator and to feed the resistance while supplying a current proportional to the speed, rectifiers rectifying the currents which flow through the condenser and the resistance, a galvanometer with a single frame and means for producing a mechanical antagonistic torque, and means for applying the difference of the rectified currents to the galvanometer so that the latter gives a deviation proportional to the algebraic difference of the mean values of the currents in the condenser and in the resistance.

6. In a tachometer, an electric generator generating an alternating current, the voltage and the frequency of which vary proportionally to the speed to be measured, a resistance and a self inductance, means for causing the generator to feed the resistance while supplying a current proportional to the speed of the generator and to feed the self inductance while supplying in a certain region a current independent of the speed, rectifiers rectifying the currents which flow through the resistance and the self inductance, and an electric receiver with means for producing an antagonistic mechanical torque, the deviation of which is proportional to the algebraic difference of the mean values of the currents in the resistance and in the self inductance.

JEAN FAURE-HERMAN.

REFERENCES CITED

The following references are of record in the file of this patent:

UNITED STATES PATENTS

| Number | Name | Date |
|---|---|---|
| 679,175 | Lincoln | July 23, 1901 |
| 1,241,993 | Kirby | Oct. 2, 1917 |
| 1,616,230 | Richmond | Feb. 1, 1927 |
| 2,443,668 | Tagg | June 22, 1948 |
| 2,500,548 | Keller | Mar. 14, 1950 |